(12) United States Patent
Wu

(10) Patent No.: US 12,500,693 B2
(45) Date of Patent: Dec. 16, 2025

(54) METHODS, APPARATUSES, AND OPTICAL NETWORK DEVICES FOR UPLINK FEC ENCODING AND DECODING

(71) Applicant: HUAWEI TECHNOLOGIES CO., LTD., Guangdong (CN)

(72) Inventor: Xuming Wu, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 248 days.

(21) Appl. No.: 18/347,829

(22) Filed: Jul. 6, 2023

(65) Prior Publication Data
US 2023/0353279 A1 Nov. 2, 2023

Related U.S. Application Data

(63) Continuation of application No. PCT/CN2021/134660, filed on Nov. 30, 2021.

(30) Foreign Application Priority Data

Jan. 7, 2021 (CN) .......................... 202110019716.6

(51) Int. Cl.
H04L 1/00 (2006.01)
H04B 10/27 (2013.01)

(52) U.S. Cl.
CPC ........... *H04L 1/0057* (2013.01); *H04B 10/27* (2013.01); *H04L 1/0061* (2013.01)

(58) Field of Classification Search
CPC ... H04L 1/0041; H04L 1/0057; H04L 1/0061; H04L 1/0067; H04L 1/0068; H04B 10/27; H04Q 11/0067
See application file for complete search history.

(56) References Cited

U.S. PATENT DOCUMENTS

2005/0111345 A1* 5/2005 Jacobsen ............... H04L 1/0041
714/704
2014/0161456 A1* 6/2014 Sugawa .............. H04J 14/0282
398/71
(Continued)

FOREIGN PATENT DOCUMENTS

CA 2758866 A1 * 10/2010 ............. H04L 47/76
CN 102158770 A 8/2011
(Continued)

OTHER PUBLICATIONS

Georgios Tzimpragos et al.,"A Survey on FEC Codes for 100G and Beyond Optical Networks, " Jan. 27, 2016, IEEE Communication Surveys & Tutorials, vol. 18, No. 1, First Quarter 2016,pp. 209-218.*

(Continued)

*Primary Examiner* — Omar S Ismail
(74) *Attorney, Agent, or Firm* — Fish & Richardson P.C.

(57) ABSTRACT

This application provides a method for uplink FEC encoding. On example method includes: obtaining a grant length of an uplink slot, where the grant length is equal to a product of a grant quantity of the uplink slot and a grant granularity, and the grant granularity is a grant granularity supported by a device to which the uplink slot belongs; and obtaining an FEC codeword of uplink data based on the grant length and an LDPC coding scheme, where the FEC codeword includes an LDPC codeword data bit, and in the LDPC coding scheme, N times the LDPC codeword data bit is divisible by the grant granularity, where N is a positive integer greater than or equal to 1.

40 Claims, 5 Drawing Sheets

Obtain a grant length of an uplink slot, where the grant length is equal to a product of a grant quantity of the uplink slot and a grant granularity, and the grant granularity is a grant granularity supported by a device to which the uplink slot belongs — 401

Obtain a forward error correction codeword of uplink data based on the grant length and a low density parity check coding scheme, where the forward error correction codeword includes a low density parity check codeword data bit, and in the low density parity check coding scheme, the low density parity check codeword data bit is divisible by the grant granularity, and/or N times the low density parity check codeword data bit is divisible by the grant granularity, where N is a positive integer greater than or equal to 1 — 402

(56) References Cited

U.S. PATENT DOCUMENTS

| | | | | |
|---|---|---|---|---|
| 2014/0282783 | A1* | 9/2014 | Totten | H04N 21/61 725/111 |
| 2015/0046775 | A1* | 2/2015 | Prodan | H03M 13/09 714/776 |
| 2019/0387293 | A1 | 12/2019 | Hajduczenia | |
| 2020/0059248 | A1 | 2/2020 | Noh et al. | |
| 2020/0295870 | A1* | 9/2020 | Jing | H04Q 11/0067 |
| 2022/0069843 | A1* | 3/2022 | Li | H04L 1/0057 |
| 2022/0085830 | A1* | 3/2022 | Li | H04L 1/0003 |

FOREIGN PATENT DOCUMENTS

| | | | | |
|---|---|---|---|---|
| CN | 102833640 | A | | 12/2012 |
| CN | 108631925 | A | | 10/2018 |
| CN | 109327224 | A | | 2/2019 |
| CN | 109873683 | A | | 6/2019 |
| CN | 110087155 | A | | 8/2019 |
| CN | 111800225 | A * | 10/2020 | ........... H04L 1/0023 |
| WO | WO-2009067899 | A1 * | 6/2009 | ............... H04L 7/04 |
| WO | 2016154382 | A1 | | 9/2016 |
| WO | WO-2018171043 | A1 * | 9/2018 | ........ H03M 13/6516 |
| WO | 2019169373 | A1 | | 9/2019 |
| WO | WO-2022148187 | A1 * | 7/2022 | ......... H04Q 11/0067 |

OTHER PUBLICATIONS

Afxendios Tychopoulos et al.,"A Tutorial Overview on the Evolution of Architectures and the Future Prospects of Outband and Inband FEC for Optical Communications,"Feb. 12, 2007, IEEE Circuits and Devices Magazine ( vol. 22, Issue: 6, Nov.-Dec. 2006),pp. 79-85.*

Ivan B. Djordjevic et al., "On Advanced FEC and Coded Modulation for Ultra-High-Speed Optical Transmission," Aug. 19, 2016, IEEE Communications Surveys & Tutorials, vol. 18, No. 3, Third Quarter 2016, pp. 1920-1947.*

"IEEE P802.3cc™/D3.03.1 Draft Standard for Ethernet AmendmentAmendment 11:Physical Layer and Management Parameters for Serial 25 GB/s Ethernet Operation Over Single-Mode Fiber", Jun. 14, 2017, Draft Amendment to IEEE Std 802.3-2015 IEEE Draft P802.3cc/D3.1, IEEE P80.*

Extended European Search Report in European Appln. No. 21917228.5, mailed on May 7, 2024, 12 pages.

International Search Report and Written Opinion in International Appln. No. PCT/CN2021/134660, mailed on Jan. 26, 2022, 17 pages (with English translation).

IEEE P802.3ca/D1.6, "Draft Standard for Ethernet Amendment: Physical Layer Specifications and Management Parameters for 25 GB/s and 50 GB/s Passive Optical Networks," Mar. 2019, 256 pages.

* cited by examiner

METHODS, APPARATUSES, AND OPTICAL NETWORK DEVICES FOR UPLINK FEC ENCODING AND DECODING

CROSS-REFERENCE TO RELATED APPLICATIONS

This application is a continuation of International Application No. PCT/CN2021/134660, filed on Nov. 30, 2021, which claims priority to Chinese Patent Application No. 202110019716.6, filed on Jan. 7, 2021. The disclosures of the aforementioned applications are hereby incorporated by reference in their entireties.

TECHNICAL FIELD

This application relates to the field of optical network communications technologies, and in particular, to methods, apparatuses, and optical network devices for uplink FEC encoding and decoding.

BACKGROUND

With rapid development of broadband access technologies, a passive optical network (PON) is already popularized in a large scale. With sharply increasing bandwidth requirements of users, a 10G PON already enters a stage of large-scale deployment, and standards for a next-generation PON are gradually specified and improved. For example, in the International Telecommunication Union-Telecommunication Standardization Sector (ITU-T), the next-generation PON is a 50G PON. In various PONs, due to a requirement of a link budget, from the 10G PON, forward error correction (FEC) encoding is a mandatory function, and redundancy coding is used, so that transmission performance of the PONs may be ensured when a specific bit error occurs in a transmission process.

In a related technology, a method for downlink FEC encoding in the 50G PON is specified. For example, an FEC encoding method selected in the 50G PON is a low density parity check (LDPC) code. Considering continuity of a downlink FEC codeword, as specified in a standard of the 50G PON, a length of the downlink FEC codeword is 17280 bits, an LDPC codeword data bit is 14592 bits, and an LDPC codeword parity bit is 2688 bits.

The PON relates to uplink and downlink transmission, but the related technology relates only to the method for downlink FEC encoding. Therefore, a method for uplink FEC encoding needs to be provided.

SUMMARY

This application provides methods, apparatuses, and optical network devices for uplink FEC encoding and decoding, to provide a method for uplink FEC encoding.

According to a first aspect, this application provides a method for uplink FEC encoding, which is applied to a high speed passive optical network (HSP). An uplink rate of the HSP is greater than 10 Gbit/s. The method includes: obtaining a grant length of an uplink slot, where the grant length is equal to a product of a grant quantity of the uplink slot and a grant granularity, and the grant granularity is a grant granularity supported by a device to which the uplink slot belongs; and obtaining an FEC codeword of uplink data based on the grant length and an LDPC coding scheme, where the FEC codeword includes an LDPC codeword data bit. In the LDPC coding scheme, the LDPC codeword data bit is divisible by the grant granularity, and/or N times the LDPC codeword data bit is divisible by the grant granularity, where N is a positive integer greater than or equal to 1.

In the solution shown in this application, the method for uplink FEC encoding may be applied to the HSP. The method may be performed by an encoding apparatus, and the encoding apparatus may determine the grant length based on the grant quantity obtained from an optical line terminal (OLT). Then, the FEC codeword of the uplink data is obtained through encoding by using the grant length and the LDPC coding scheme. The FEC codeword includes the LDPC codeword data bit. In the LDPC coding scheme, the LDPC codeword data bit is divisible by the grant granularity, and/or N times the LDPC codeword data bit is divisible by the grant granularity, where N is a positive integer greater than or equal to 1. In this way, the grant length is equal to a positive integer multiple of a length of the LDPC codeword data bit. Therefore, in these cases, each FEC codeword of the uplink data is a complete FEC codeword. That is, when an LDPC codeword parity bit is transmitted, uplink data of a specified LDPC codeword data bit length is transmitted, and an overall code rate is high. Therefore, not only a method for uplink FEC encoding is provided, but also the overall code rate is high.

In a possible implementation, the FEC codeword further includes an LDPC codeword parity bit. In the LDPC coding scheme, the LDPC codeword parity bit is divisible by the grant granularity, and/or M times the LDPC codeword parity bit is divisible by the grant granularity, where M is a positive integer greater than or equal to 1.

In the solution shown in this application, the FEC codeword further includes the LDPC codeword parity bit. In the LDPC coding scheme, the LDPC codeword parity bit is divisible by the grant granularity, and/or M times the LDPC codeword parity bit is divisible by the grant granularity, where M is a positive integer greater than or equal to 1. In this way, the LDPC codeword parity bit in each FEC codeword is an integral quantity of grant granularities, or LDPC codeword parity bits as a whole in a plurality of FEC codewords are an integral quantity of grant granularities, thereby facilitating the OLT in reserving, for an ONU, a slot to be occupied by the LDPC codeword parity bit.

In a possible implementation, the obtaining an FEC codeword of uplink data based on the grant length and an LDPC coding scheme includes: obtaining the FEC codeword of the uplink data based on the grant length, the LDPC codeword data bit in the LDPC coding scheme, and a mother code matrix corresponding to the LDPC coding scheme.

In the solution shown in this application, the ONU obtains a mother code matrix of an LDPC coding scheme for downlink encoding, and uses the mother code matrix as a mother code matrix of an LDPC coding scheme for uplink encoding. A quantity of FEC codewords of the uplink data is determined based on the grant length. In each FEC codeword, if a truncation length of the uplink data is s, the uplink data is supplemented with 0s of s bits. Then, the uplink data supplemented with 0s is encoded with the mother code matrix, to obtain an LDPC codeword data bit and an LDPC codeword parity bit in the FEC codeword. Then, the LDPC codeword parity bit in the FEC codeword is pruned, to obtain a pruned FEC codeword of the uplink data. In this way, the FEC codeword of the uplink data may be obtained.

In a possible implementation, the HSP is a 50G passive optical network PON. The LDPC codeword data bit in the LDPC coding scheme is 1760 bytes, and the LDPC codeword parity bit in the LDPC coding scheme is 320 bytes.

When an uplink rate of the 50G PON is 12.5 Gbit/s, a corresponding grant granularity is 20 bytes. When the uplink rate of the 50G PON is 25 Gbit/s, a corresponding grant granularity is 40 bytes. When the uplink rate of the 50G PON is 50 Gbit/s, a corresponding grant granularity is 80 bytes.

In this way, when the LDPC coding scheme for downlink encoding is used as the LDPC coding scheme for uplink encoding, an LDPC codeword data bit is 1824 bytes, an LDPC codeword parity bit is 336 bytes, and a code rate is 1824/(1824+336)=84.4. After the LDPC codeword data bit and the LDPC codeword parity bit are pruned, an LDPC codeword data bit in the LDPC coding scheme for uplink encoding is 1760 bytes, an LDPC codeword parity bit in the LDPC coding scheme for uplink encoding is 320 bytes, and a code rate is 1760/(1760+320)=84.6. The code rate is close to the code rate of the used LDPC coding scheme for downlink encoding. In addition, the LDPC codeword parity bit and the LDPC codeword data bit are integral quantities of grant granularities. There may be a grant length equal to an integral quantity of lengths of the LDPC codeword data bit. In this way, the uplink data may be transmitted as much as possible when an equal quantity of LDPC codeword parity bits are transmitted.

In a possible implementation, N times the LDPC codeword data bit is divisible by the grant granularity, M times the LDPC codeword parity bit is divisible by the grant granularity, and the LDPC coding scheme is an LDPC coding scheme for downlink encoding corresponding to the HSP.

In this way, the downlink LDPC coding scheme is used as the uplink LDPC coding scheme, so that compatibility between uplink encoding and downlink encoding is better.

In a possible implementation, the HSP is a 50G PON. The LDPC codeword data bit in the LDPC coding scheme is 1824 bytes, and N is 2; and the LDPC codeword parity bit in the LDPC coding scheme is 336 bytes, and M is 4. When an uplink rate of the 50G PON is 12.5 Gbit/s, a corresponding grant granularity is 16 bytes. When the uplink rate of the 50G PON is 25 Gbit/s, a corresponding grant granularity is 32 bytes. When the uplink rate of the 50G PON is 50 Gbit/s, a corresponding grant granularity is 64 bytes.

In this way, based on the existing LDPC coding scheme for downlink encoding, only the grant granularity is adjusted, so that the uplink data may be transmitted as much as possible when an equal quantity of LDPC codeword parity bits are transmitted. In addition, only the grant granularity is adjusted, so that 4 times the LDPC codeword parity bit is divisible by the grant granularity. Therefore, when reserving the LDPC codeword parity bit, the OLT may reserve the LDPC codeword parity bit based on an integral quantity of slots, thereby reducing bandwidth waste. Therefore, with a minimal modification, a reuse logic design of downlink encoding and uplink encoding may be implemented to a maximum extent.

In a possible implementation, the HSP is a 50G PON. The LDPC codeword data bit in the LDPC coding scheme is 1824 bytes, and N is 1; and the LDPC codeword parity bit in the LDPC coding scheme is 336 bytes, and M is 1. When an uplink rate of the 50G PON is 12.5 Gbit/s, a corresponding grant granularity is 4 bytes. When the uplink rate of the 50G PON is 25 Gbit/s, a corresponding grant granularity is 8 bytes. When the uplink rate of the 50G PON is 50 Gbit/s, a corresponding grant granularity is 16 bytes.

In this way, based on the existing LDPC coding scheme for downlink encoding, only the grant granularity is adjusted, so that the uplink data may be transmitted as much as possible when an equal quantity of LDPC codeword parity bits are transmitted. In addition, only the grant granularity is adjusted, so that the LDPC codeword parity bit is divisible by the grant granularity. Therefore, when reserving the LDPC codeword parity bit, the OLT may reserve the LDPC codeword parity bit based on an integral quantity of slots, thereby reducing bandwidth waste. Therefore, with a minimal modification, a reuse logic design of downlink encoding and uplink encoding may be implemented to a maximum extent.

According to a second aspect, this application provides a method for uplink FEC decoding, which is applied to an HSP. An uplink rate of the HSP is greater than 10 Gbit/s. The method includes: receiving an FEC codeword of uplink data, where the FEC codeword includes an LDPC codeword data bit; and obtaining the uplink data based on the FEC codeword, an LDPC decoding scheme, and a grant length corresponding to an uplink slot, where the grant length is equal to a product of a grant quantity of the uplink slot and a grant granularity. In the LDPC decoding scheme, the LDPC codeword data bit is divisible by the grant granularity, and/or N times the LDPC codeword data bit is divisible by the grant granularity, where N is a positive integer greater than or equal to 1.

In the solution shown in this application, the method for uplink FEC decoding may be applied to the HSP. The method may be implemented by an OLT, and the OLT may receive the FEC codeword of the uplink data. Then, the OLT may obtain a grant quantity of a slot allocated by the OLT to an ONU and a grant granularity of the ONU, and multiply the grant quantity and the grant granularity to obtain a grant length. The OLT may determine, based on the grant length allocated by the OLT to the ONU, the FEC codeword sent by the ONU, and then decode, by using the LDPC decoding scheme, the FEC codeword sent by the ONU, to obtain the uplink data sent by the ONU. In the LDPC decoding scheme, the LDPC codeword data bit is divisible by the grant granularity, and/or N times the LDPC codeword data bit is divisible by the grant granularity, where N is a positive integer greater than or equal to 1. In this way, corresponding to the method for uplink FEC encoding, a method for uplink FEC decoding is provided.

In a possible implementation, the FEC codeword further includes an LDPC codeword parity bit. In the LDPC decoding scheme, the LDPC codeword parity bit is divisible by the grant granularity, and/or M times the LDPC codeword parity bit is divisible by the grant granularity, where M is a positive integer greater than or equal to 1.

In the solution shown in this application, the FEC codeword further includes the LDPC codeword parity bit. In the LDPC decoding scheme, the LDPC codeword parity bit is divisible by the grant granularity, and/or M times the LDPC codeword parity bit is divisible by the grant granularity, where M is a positive integer greater than or equal to 1. In this way, the LDPC codeword parity bit in each FEC codeword is an integral quantity of grant granularities, or LDPC codeword parity bits as a whole in a plurality of FEC codewords are an integral quantity of grant granularities, thereby facilitating the OLT in reserving, for the ONU, a slot to be occupied by the LDPC codeword parity bit.

In a possible implementation, the obtaining the uplink data based on the FEC codeword, an LDPC decoding scheme, and a grant length corresponding to an uplink slot includes: obtaining the uplink data based on the FEC codeword, the LDPC codeword data bit in the LDPC decoding scheme, a mother code matrix corresponding to the LDPC decoding scheme, and the grant length corresponding to the uplink slot.

In the solution shown in this application, the OLT may determine, based on the grant length allocated by the OLT to the ONU, the FEC codeword sent by the ONU. Then, the OLT obtains a mother code matrix corresponding to an LDPC decoding scheme for downlink decoding, and determines the mother code matrix as a mother code matrix corresponding to an LDPC decoding scheme for uplink decoding. Each FEC codeword is checked to obtain the uplink data. In this way, the uplink data in the FEC codeword may be obtained.

In a possible implementation, the HSP is a 50G passive optical network PON. The LDPC codeword data bit in the LDPC decoding scheme is 1760 bytes, and the LDPC codeword parity bit in the LDPC decoding scheme is 320 bytes. When an uplink rate of the 50G PON is 12.5 Gbit/s, a corresponding grant granularity is 20 bytes. When the uplink rate of the 50G PON is 25 Gbit/s, a corresponding grant granularity is 40 bytes. When the uplink rate of the 50G PON is 50 Gbit/s, a corresponding grant granularity is 80 bytes.

In a possible implementation, N times the LDPC codeword data bit is divisible by the grant granularity, M times the LDPC codeword parity bit is divisible by the grant granularity, and the LDPC decoding scheme is an LDPC decoding scheme for downlink decoding corresponding to the HSP.

In this way, the downlink LDPC decoding scheme may be used as the uplink LDPC decoding scheme, so that compatibility between uplink decoding and downlink decoding is better.

In a possible implementation, the HSP is a 50G PON. The LDPC codeword data bit in the LDPC decoding scheme is 1824 bytes, and N is 2; and the LDPC codeword parity bit in the LDPC decoding scheme is 336 bytes, and M is 4. When an uplink rate of the 50G PON is 12.5 Gbit/s, a corresponding grant granularity is 16 bytes. When the uplink rate of the 50G PON is 25 Gbit/s, a corresponding grant granularity is 32 bytes. When the uplink rate of the 50G PON is 50 Gbit/s, a corresponding grant granularity is 64 bytes.

In this way, based on the existing LDPC decoding scheme for downlink decoding, only the grant granularity is adjusted, so that a reuse logic design of downlink decoding and uplink decoding may be implemented to a maximum extent.

In a possible implementation, the HSP is a 50G PON. The LDPC codeword data bit in the LDPC decoding scheme is 1824 bytes, and N is 1; and the LDPC codeword parity bit in the LDPC decoding scheme is 336 bytes, and M is 1. When an uplink rate of the 50G PON is 12.5 Gbit/s, a corresponding grant granularity is 4 bytes. When the uplink rate of the 50G PON is 25 Gbit/s, a corresponding grant granularity is 8 bytes. When the uplink rate of the 50G PON is 50 Gbit/s, a corresponding grant granularity is 16 bytes.

In this way, based on the existing LDPC decoding scheme for downlink decoding, only the grant granularity is adjusted, so that a reuse logic design of downlink decoding and uplink decoding may be implemented to a maximum extent.

According to a third aspect, this application provides an apparatus for uplink FEC encoding. The apparatus includes one or more modules, and the one or more modules are configured to implement the method for uplink FEC encoding according to the first aspect. According to a fourth aspect, this application provides an apparatus for uplink FEC decoding. The apparatus includes one or more modules, and the one or more modules are configured to implement the method for uplink FEC decoding according to the second aspect.

According to a fifth aspect, this application provides an optical network device for uplink FEC encoding. The optical network device includes a processor and a communications interface. The communications interface is configured to receive a grant quantity of an uplink slot. The processor is configured to implement encoding processing in the method according to the first aspect and the possible implementations of the first aspect.

According to a sixth aspect, this application provides a computer-readable storage medium. The computer-readable storage medium stores computer instructions, and when the computer instructions in the computer-readable storage medium are executed by an optical network device, the optical network device is enabled to perform the method according to the first aspect and the possible implementations of the first aspect, or the optical network device is enabled to implement a function of the apparatus according to the third aspect and the possible implementations of the third aspect.

According to a seventh aspect, this application provides a computer program product including instructions. When the computer program product is run on an optical network device, the optical network device is enabled to perform the method according to the first aspect and the possible implementations of the first aspect, or the optical network device is enabled to implement a function of the apparatus according to the third aspect and the possible implementations of the third aspect.

According to an eighth aspect, this application provides an optical network device for uplink FEC decoding. The optical network device includes a processor and a communications interface. The communications interface is configured to receive an FEC codeword of uplink data. The processor is configured to implement decoding processing in the method according to the second aspect and the possible implementations of the second aspect.

According to a ninth aspect, this application provides a computer-readable storage medium. The computer-readable storage medium stores computer instructions, and when the computer instructions in the computer-readable storage medium are executed by an optical network device, the optical network device is enabled to perform the method according to the second aspect and the possible implementations of the second aspect, or the optical network device is enabled to implement a function of the apparatus according to the fourth aspect and the possible implementations of the fourth aspect.

According to a tenth aspect, this application provides a computer program product including instructions. When the computer program product is run on an optical network device, the optical network device is enabled to perform the method according to the second aspect and the possible implementations of the second aspect, or the optical network device is enabled to implement a function of the apparatus according to the fourth aspect and the possible implementations of the fourth aspect.

According to an eleventh aspect, this application provides a system for uplink FEC encoding and uplink FEC decoding. The system includes the apparatus for uplink FEC encoding according to the third aspect and the apparatus for uplink FEC decoding according to the fourth aspect.

DESCRIPTION OF EMBODIMENTS

To make the objectives, technical solutions, and advantages of this application clearer, the following further describes implementations of this application in detail with reference to accompanying drawings.

For ease of understanding of embodiments of this application, the following first describes concepts of related terms.

Figure 1:
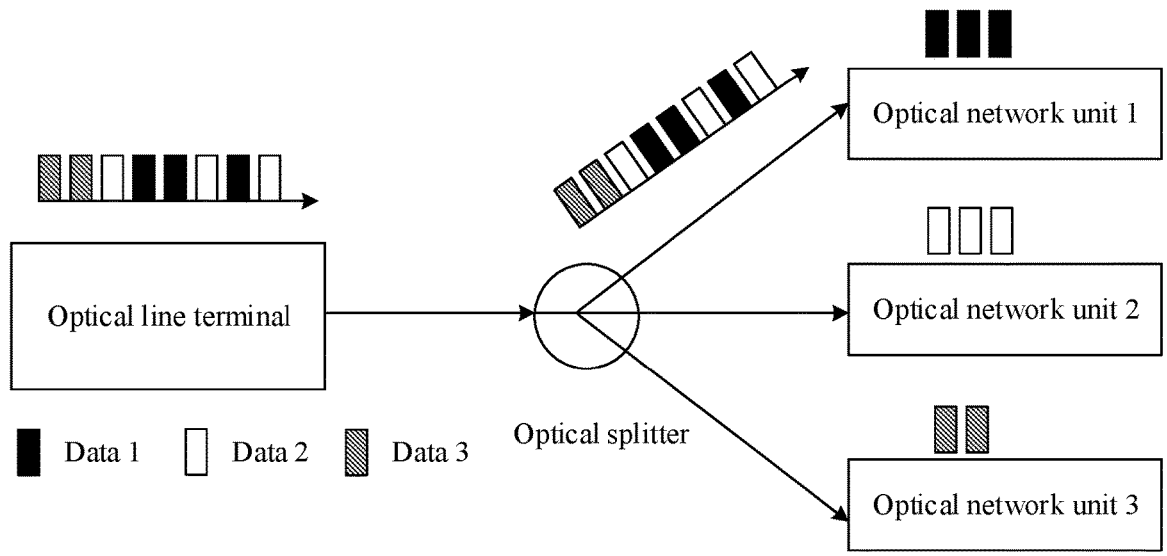
FIG. 1 is a schematic diagram of downlink transmission in a PON according to an example embodiment of this application.

1. PON downlink transmission process: An optical line terminal (OLT) divides one piece of downlink data into N pieces of downlink data by using a splitter (splitter), and simultaneously sends the N pieces of downlink data to all optical network units (ONU) or optical network terminals (ONT) connected to the OLT. The ONU or the ONT selectively receives downlink data with a same number as the ONU or the ONT, and discards other data. In the embodiments of this application, the ONU is used as an example for description. As shown in FIG. 1, the OLT is connected to three ONUs (an ONU 1, an ONU 2, and an ONU 3). Data of the ONU 1 is data 1, data of the ONU 2 is data 2, and data of the ONU 3 is data 3. The ONU 1 receives only the data 1, the ONU 2 receives only the data 2, and the ONU 3 receives only the data 3. Data may be continuously transmitted during downlink transmission. Therefore, downlink transmission in a PON is in a continuous mode.

Figure 2:
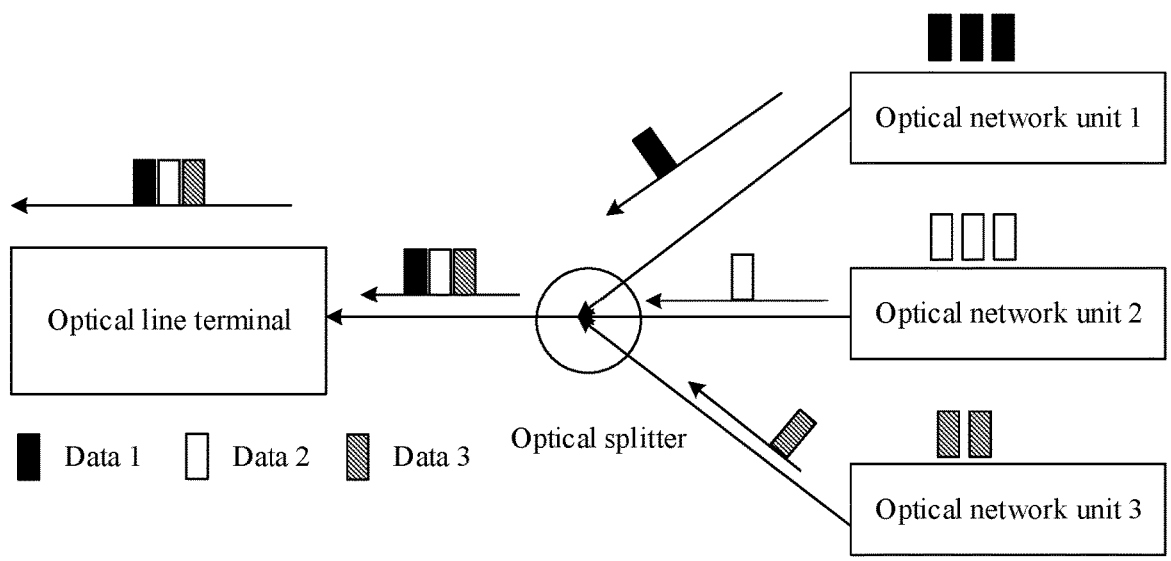
FIG. 2 is a schematic diagram of uplink transmission in a PON according to an example embodiment of this application.

2. PON uplink transmission process: A plurality of ONUs perform uplink transmission by using a time division multiple access (TDMA) technology. A principle is as follows: An OLT divides an uplink transmission time into slots Ti (i=1, 2, 3, . . . , 32, . . . ). The slots may be referred to as uplink slots. In each slot, only one ONU is arranged to send data to the OLT. The ONUs sequentially send data in an order specified by the OLT, to avoid a conflict between the ONUs. Each ONU transmits an optical signal only in a slot allocated by the OLT to the ONU, and needs to disable a transmitter in other slots. Otherwise, a plurality of ONUs simultaneously transmit optical signals, causing a conflict. Consequently, the OLT cannot correctly receive data of the ONUs, and all services of an entire PON are interrupted. As shown in FIG. 2, the OLT is connected to three ONUs (an ONU 1, an ONU 2, and an ONU 3). Data of the ONU 1 is data 1, data of the ONU 2 is data 2, and data of the ONU 3 is data 3. The ONU 1 sends the data 1 to the OLT, the ONU 2 sends the data 2 to the OLT, and the ONU 3 sends the data 3 to the OLT. Each ONU transmits data in a different slot during uplink transmission. Therefore, uplink transmission in the PON is in a burst mode.

3. HSP: is a PON with a rate greater than 10 Gbit/s. The rate includes an uplink rate and a downlink rate. For example, the HSP is a 50G PON, a 25G PON, or the like. Herein, the rate greater than 10 Gbit/s means that a volume of data transmitted per second is greater than 10 gigabits.

4. FEC encoding: means that a redundant error-correcting code is added to transmitted data, so that under a specific condition, a transmission error code may be automatically corrected through decoding. In an HSP, an FEC coding scheme may include an LDPC coding scheme. When the LDPC coding scheme is used for FEC encoding, an FEC codeword includes an LDPC codeword data bit and an LDPC codeword parity bit.

5. Uplink slot: is a slot allocated by an OLT to an ONU each time. The uplink slot has a basic unit, and the basic unit is a grant granularity.

6. Grant length: is equal to a product of a grant quantity of an uplink slot and a grant granularity. Because the grant quantity of the uplink slot is an integer, the grant length is necessarily an integer multiple of the grant granularity. It should be noted herein that the grant length provided by an OLT to an ONU is used to transmit uplink data, and is not used to transmit an overhead part. The overhead part refers to an LDPC codeword parity bit mentioned subsequently, and the LDPC codeword parity bit is transmitted in a slot reserved by the OLT for the ONU by default. For example, the OLT allocates slots 0 to 80 to the ONU, slots 81 to 100 are used by the ONU to transmit the LDPC codeword parity bit, and the slots 81 to 100 are not allocated to another ONU.

In a related technology, a method for downlink FEC encoding in a 50G PON is specified, but a method for uplink FEC encoding is not specified. Therefore, a method for uplink FEC encoding needs to be provided.

In addition, considering a compatibility design of uplink and downlink transmission, downlink FEC encoding needs to be referenced for uplink FEC encoding. In a manner, to simplify FEC encoding and decoding designs of an ONU and an OLT, downlink FEC encoding may be used as uplink FEC encoding. An LDPC coding scheme is used for downlink FEC encoding. An FEC codeword obtained through encoding by using the LDPC coding scheme is 17280 bits, that is, 2160 bytes; an LDPC codeword data bit is 14592 bits, that is, 1824 bytes; and an LDPC codeword parity bit is 336 bytes. The 50G PON has a plurality of uplink rates: 12.5 Gbit/s, 25 Gbit/s, and 50 Gbit/s, which respectively correspond to grant granularities 20 bytes, 40 bytes, and 80 bytes. The LDPC codeword data bit is 1824 bytes, which is not divisible by 20 bytes, 40 bytes, or 80 bytes. In this way, for an LDPC codeword selected in this manner, an incomplete FEC codeword may appear in a process of sending uplink data. In some cases, there is bandwidth waste. For example, a grant quantity of an uplink slot provided by the OLT for an ONU is 22, a grant granularity is 80 bytes, and a grant length of the uplink slot is equal to 1760 bytes. The LDPC codeword data bit is 1824 bytes, and each FEC codeword includes uplink data of up to 1824 bytes. Because the grant length is 1760 bytes, the ONU can transmit uplink data of up to 1760 bytes this time. A length of data sent by the ONU is (1760 bytes+336 bytes). It may be learned that an LDPC codeword parity bit of 336 bytes needs to be sent when uplink data of 1824 bytes is not sent yet, and a code rate is 1760/(1760+336)=83.9%. For another example, a grant quantity of an uplink slot provided by the OLT for an ONU is 23, a grant granularity is 80 bytes, and a grant length of the uplink slot is equal to 1840 bytes. The LDPC codeword data bit is 1824 bytes, and each FEC codeword includes uplink data of up to 1824 bytes. A length of data sent by the ONU is (1824 bytes+336 bytes)+ (16 bytes+336 bytes). It may be learned that an LDPC codeword parity bit of 336 bytes needs to be sent when uplink data of 16 bytes in a second FEC codeword is sent, and a code rate is 1824+16/(1824 bytes+336 bytes)+ (16 bytes+336 bytes) =73.2%. Regardless of a length of an LDPC codeword data bit included in an FEC codeword, an LDPC codeword parity bit of 336 bytes needs to be sent in the FEC codeword. Therefore, when the LDPC codeword data bit is not divisible by the grant granularity, some bandwidth waste may be caused.

Based on the foregoing problem, this application provides a method for uplink FEC encoding, and the method may be performed by an encoding apparatus. The encoding apparatus may be a software program installed on an optical network device. The encoding apparatus may alternatively be a hardware apparatus, for example, an optical network device. The optical network device is an ONU or an ONT.

Figure 3:
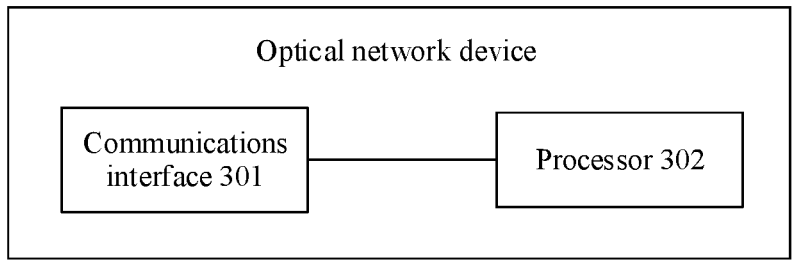
FIG. 3 is a schematic diagram of a structure of an optical network device according to an example embodiment of this application.

When the encoding apparatus is a hardware apparatus, as shown in FIG. 3, a schematic diagram of a structure of an optical network device is provided. The optical network device includes a communications interface 301 and a processor 302.

The processor 302 may use a general-purpose central processing unit ( ) a microprocessor, an application-specific integrated circuit (ASIC), a graphics processing unit (GPU), or one or more integrated circuits. The processor 302 may alternatively be a digital signal processor (DSP), a field programmable gate array (FPGA) or another programmable logic device, a discrete gate or transistor logic device, or a discrete hardware component. In this embodiment of this application, the processor 302 may be configured to implement FEC encoding processing.

The communications interface 301 is configured to implement communication between the optical network device and another device. In this embodiment of this application, the communications interface 301 may be configured to receive a grant quantity of an uplink slot.

Figure 4:
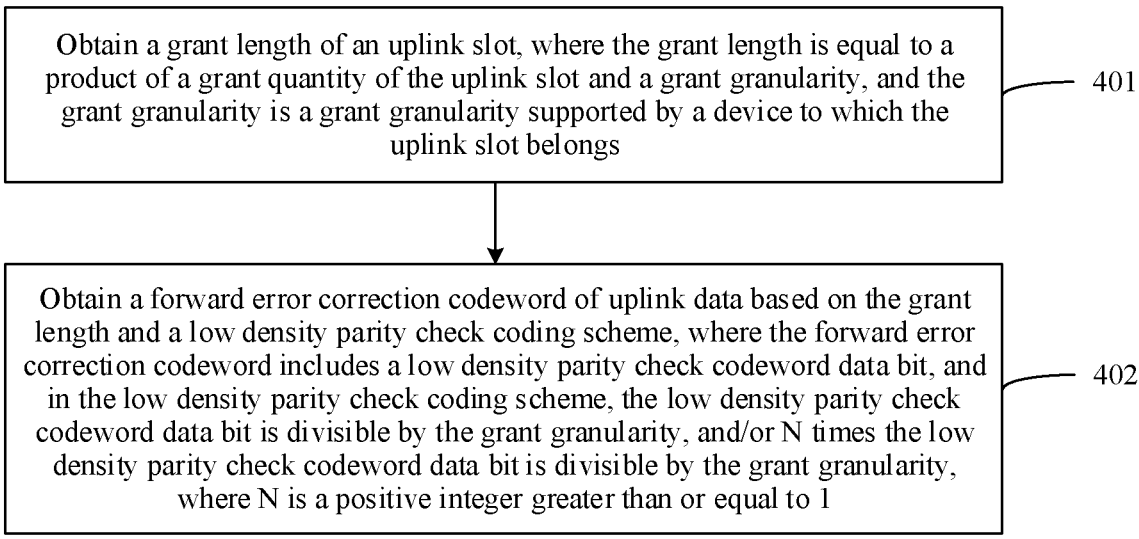
FIG. 4 is a schematic flowchart of a method for uplink FEC encoding according to an example embodiment of this application.

With reference to FIG. 4, the following describes a method for uplink FEC encoding provided in an embodiment of this application. The method may be performed by an ONU. FIG. 4 describes a procedure in which the ONU encodes uplink data once. As shown in FIG. 4, a processing procedure of the method is as follows:

Step 401: Obtain a grant length of an uplink slot, where the grant length is equal to a product of a grant quantity of the uplink slot and a grant granularity, and the grant granularity is a grant granularity supported by a device to which the uplink slot belongs.

The uplink slot is used by the ONU to transmit uplink data to an OLT, and each ONU transmits uplink data only in an uplink slot allocated by the OLT to the ONU. The grant length is equal to the product of the grant quantity of the uplink slot and the grant granularity, and the grant granularity is the grant granularity supported by the device to which the uplink slot belongs. The grant quantity may also be referred to as a grant size.

In this embodiment, the OLT may allocate, based on a slot allocation rule, uplink slots to all ONUs connected to the OLT. Because a bandwidth requirement of each ONU is different, an uplink slot allocated to each ONU is different. The allocated uplink slot may include a start point of the uplink slot and a grant quantity of the uplink slot.

After obtaining the grant quantity of the uplink slot, the ONU may obtain a stored grant granularity. When an uplink rate of the ONU is different, the grant granularity of the ONU is different. The uplink rate is directly proportional to the grant granularity. The ONU may obtain a grant length of the uplink slot by multiplying the grant quantity and the grant granularity. For example, an HSP is a 50G PON, a grant granularity of the 50G PON is 80 bytes, a grant quantity is 22, and a grant length is 1760 bytes.

Step 402: Obtain an FEC codeword of uplink data based on the grant length and an LDPC coding scheme, where the FEC codeword includes an LDPC codeword data bit. In the LDPC coding scheme, the LDPC codeword data bit is divisible by the grant granularity, and/or N times the LDPC codeword data bit is divisible by the grant granularity, where N is a positive integer greater than or equal to 1.

Figure 5:
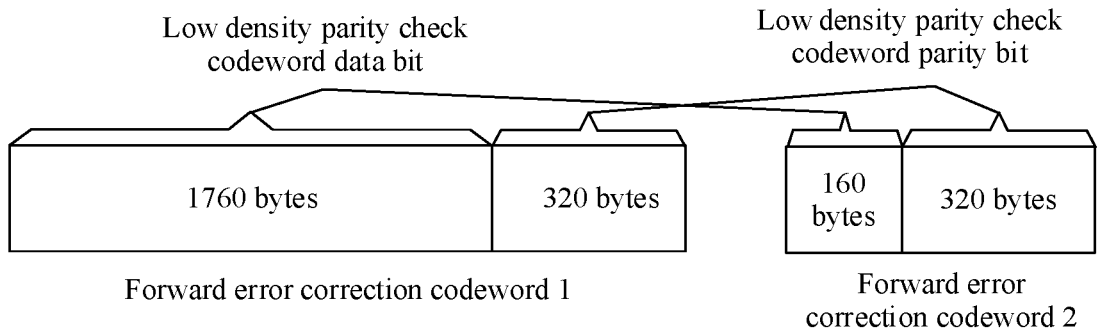
FIG. 5 is a schematic diagram of an FEC codeword according to an example embodiment of this application.

The LDPC coding scheme is one type of FEC coding scheme, and may be used for encoding for uplink transmission. After LDPC encoding is performed on data, an FEC codeword of the data is obtained. As shown in FIG. 5, each FEC codeword includes an LDPC codeword data bit and an LDPC codeword parity bit, and lengths of LDPC codeword parity bits in all FEC codewords are the same. FIG. 5 shows two FEC codewords. An LDPC codeword data bit of an FEC codeword 1 is 1760 bytes, an LDPC codeword data bit of an FEC codeword 2 is 160 bytes, and LDPC codeword parity bits of the FEC codeword 1 and the FEC codeword 2 are both 320 bytes. As specified in the LDPC coding scheme, the LDPC codeword data bit is divisible by the grant granularity, and/or N times the LDPC codeword data bit is divisible by the grant granularity, where N is a positive integer greater than or equal to 1. The uplink data herein is data transmitted from the ONU to the OLT, and may be service data of the ONU, other data, or the like.

In this embodiment, the ONU determines, by using the grant length, the uplink data transmitted by the ONU this time. Then, the uplink data is encoded by using the LDPC coding scheme, to obtain the FEC codeword of the uplink data. For a specific encoding process, refer to an LDPC encoding principle.

For example, if the LDPC codeword data bit is divisible by the grant granularity, or N times the LDPC codeword data bit is divisible by the grant granularity, a case in which the grant length is equal to a positive integer multiple of a length of the LDPC codeword data bit may occur. In these cases, after the uplink data is encoded by using the LDPC coding scheme, one or more complete FEC codewords of the uplink data are obtained. Each FEC codeword includes an LDPC codeword data bit and an LDPC codeword parity bit of the uplink data. A sum of lengths of LDPC codeword data bits in all FEC codewords is equal to the grant length. A complete FEC codeword is an FEC codeword that includes an LDPC codeword data bit whose length is equal to a specified LDPC codeword data bit length. In this way, because the LDPC codeword parity bit needs to be transmitted when each FEC codeword is transmitted, when the length of the LDPC codeword data bit in the FEC codeword is equal to the specified LDPC codeword data bit length, it is equivalent to that a maximum volume of uplink data can be transmitted when each FEC codeword is transmitted. Therefore, in this manner, a large volume of uplink data can be transmitted.

In addition, if the grant length is less than the LDPC codeword data bit length in the LDPC coding scheme, one FEC codeword may be obtained after the uplink data is encoded by using the LDPC coding scheme. The one FEC codeword includes an LDPC codeword data bit and an LDPC codeword parity bit of the uplink data. In this way, because the grant length is less than the LDPC codeword data bit length in the LDPC coding scheme, the uplink data needs to be supplemented with 0s at the end of the uplink data during encoding, so that a data volume of the uplink data supplemented with 0s is equal to the LDPC codeword data bit length specified in the LDPC coding scheme. After the encoding is completed, the supplemented 0s are deleted. Therefore, a data volume of the transmitted uplink data is less than the specified LDPC codeword data bit length. Further, a length of the LDPC codeword data bit in the one FEC codeword is less than the specified LDPC codeword data bit length.

In addition, if the grant length is greater than the LDPC codeword data bit length in the LDPC coding scheme, at least one complete FEC codeword may be obtained after the uplink data is encoded by using the LDPC coding scheme. Each FEC codeword includes an LDPC codeword data bit and an LDPC codeword parity bit of the uplink data. In the complete FEC codeword, a length of an LDPC codeword data bit is equal to the LDPC codeword data bit length specified in the LDPC coding scheme. In an incomplete FEC codeword, uplink data needs to be supplemented with 0s in front of the uplink data during encoding, so that a data volume of the uplink data supplemented with 0s is equal to the LDPC codeword data bit length specified in the LDPC coding scheme. In this way, a data volume of the encoded uplink data is equal to the grant length. Therefore, a length of an LDPC codeword data bit in the incomplete FEC codeword is less than the LDPC codeword data bit length in the LDPC coding scheme.

Optionally, an FEC encoding procedure may be implemented at a transmission convergence (TC) layer of the ONU. After the FEC codeword of the uplink data is obtained through encoding at the TC layer, the FEC codeword is sent to a physical layer of the ONU for processing. After being processed at the physical layer of the ONU, the FEC codeword is sent to the OLT by using an optical fiber.

In this way, in this embodiment of this application, as specified in the LDPC coding scheme for uplink encoding, the LDPC codeword data bit is divisible by the grant granularity, and/or N times the LDPC codeword data bit is divisible by the grant granularity, so that the grant length is equal to a positive integer multiple of a length of the LDPC codeword data bit. Therefore, in these cases, each FEC codeword of the uplink data is a complete FEC codeword. That is, when an LDPC codeword parity bit is transmitted, uplink data of a specified LDPC codeword data bit length is transmitted, and an overall code rate is high. Therefore, not only a method for uplink FEC encoding is provided, but also the overall code rate is high.

The following further describes the procedure shown in FIG. 4.

In a possible implementation, a relationship between the LDPC codeword parity bit in the LDPC coding scheme and the grant granularity may be:

1. The LDPC codeword parity bit in the LDPC coding scheme is divisible by the grant granularity. For example, the grant granularity is 80 bytes, the LDPC codeword parity bit is 320 bytes, and the OLT may reserve four slots for the ONU. In this way, the LDPC codeword parity bit in each FEC codeword is an integral quantity of grant granularities, thereby facilitating the OLT in reserving, for the ONU, a slot to be occupied by the LDPC codeword parity bit.
2. M times the LDPC codeword parity bit is divisible by the grant granularity, where M is a positive integer greater than or equal to 1. For example, M is 4, the grant granularity is 64 bytes, and the LDPC codeword parity bit is 336 bytes. Although 336 is not divisible by 64, 4 times 336 is divisible by 64. In this way, LDPC codeword parity bits as a whole in four FEC codewords are also an integral quantity of grant granularities, so that on the whole, the OLT may reserve, for the ONU, an integral quantity of slots for transmitting the LDPC codeword parity bits.
3. In the LDPC coding scheme, the LDPC codeword parity bit is divisible by the grant granularity, and M times the LDPC codeword parity bit is divisible by the grant granularity, where M is a positive integer greater than or equal to 1. In this way, the foregoing two conditions are both met, thereby further facilitating the OLT in reserving, for the ONU, a slot to be occupied by the LDPC codeword parity bit.

In a possible implementation, if the LDPC codeword data bit in the LDPC coding scheme is divisible by the grant granularity, processing in step 402 is: obtaining the FEC codeword of the uplink data based on the grant length, the LDPC codeword data bit in the LDPC coding scheme, and a mother code matrix corresponding to the LDPC coding scheme.

The mother code matrix corresponding to the LDPC coding scheme may be pre-stored in the ONU. The mother code matrix may be a 12×69 quasi-cyclic matrix with a cycle size of 256. The mother code matrix herein is the same as a mother code matrix defined in downlink encoding.

In this embodiment, the ONU obtains a mother code matrix of an LDPC coding scheme for downlink encoding, and uses the mother code matrix as a mother code matrix of an LDPC coding scheme for uplink encoding. A quantity of FEC codewords of the uplink data is determined based on the grant length. In each FEC codeword, if a truncation length of the uplink data is s, the uplink data is supplemented with 0s of s bits. Then, the uplink data supplemented with 0s is encoded with the mother code matrix, to obtain an LDPC codeword data bit and an LDPC codeword parity bit in the FEC codeword. Then, the LDPC codeword parity bit in the FEC codeword is pruned, to obtain a pruned FEC codeword of the uplink data, that is, to obtain an FEC codeword that may be used for uplink transmission. For example, the pruning may be performing puncturing processing on the generated LDPC codeword parity bit, to obtain the FEC codeword of the uplink data. For detailed puncturing processing, refer to a standard of the LDPC coding scheme for downlink encoding.

Figure 6:
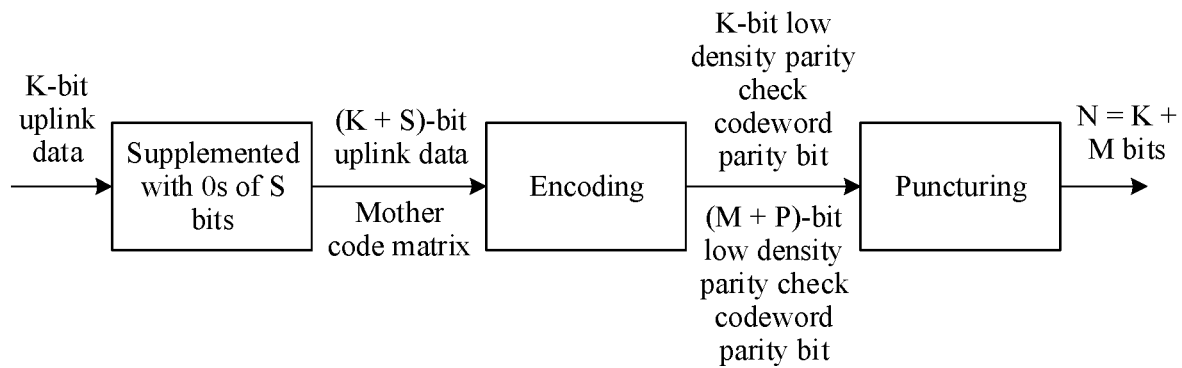
FIG. 6 is a schematic diagram of FEC encoding according to an example embodiment of this application.

As shown in FIG. 6, an FEC encoding procedure is provided. Uplink data is K bits. It is assumed that the uplink data is truncated by S bits, an LDPC codeword parity bit is P bits, a punctured LDPC codeword parity bit is M bits, and a quantity n of bits of an FEC codeword=K+M. K+S bits are obtained after the K-bit uplink data is supplemented with 0s of S bits at the end of the K-bit uplink data, and the (K+S)-bit uplink data is encoded with a mother code matrix to obtain a K-bit LDPC codeword data bit and an (M+P)-bit LDPC codeword parity bit. Puncturing processing is performed on the (M+P)-bit LDPC codeword parity bit to obtain an FEC codeword of N=K+M bits.

It should be noted herein that, in this embodiment of this application, cases in which uplink data needs to be truncated include but are not limited to:

Case 1: In an existing LDPC coding scheme for downlink encoding, an LDPC codeword data bit is 1824 bytes. In this embodiment of this application, an LDPC codeword data bit is less than 1824 bytes. Because a length of an LDPC codeword data bit included in each complete FEC codeword is less than 1824 bytes, uplink data needs to be truncated.

Case 2: In an existing LDPC coding scheme for downlink encoding, an LDPC codeword data bit is 1824 bytes. In this embodiment of this application, a grant length is less than one complete FEC codeword. Because uplink data is less than 1824 bytes, the uplink data needs to be truncated.

In a possible implementation, when an HSP is a 50G PON, in an original LDPC coding scheme for downlink encoding, an LDPC codeword data bit is 1824 bytes, and an LDPC codeword parity bit is 336 bytes. After the LDPC codeword data bit and the LDPC codeword parity bit are pruned, an LDPC codeword data bit in an LDPC coding scheme for uplink encoding is 1760 bytes, and an LDPC codeword parity bit in the LDPC coding scheme for uplink encoding is 320 bytes. When an uplink rate of the 50G PON is 12.5 Gbit/s, a corresponding grant granularity is 20 bytes, and the LDPC codeword data bit and the LDPC codeword parity bit are divisible by 20 bytes. When the uplink rate of the 50G PON is 25 Gbit/s, a corresponding grant granularity is 40 bytes, and the LDPC codeword data bit and the LDPC codeword parity bit are divisible by 40 bytes. When the uplink rate of the 50G PON is 50 Gbit/s, a corresponding grant granularity is 80 bytes, and the LDPC codeword data bit and the LDPC codeword parity bit are divisible by 80 bytes.

Figure 7:
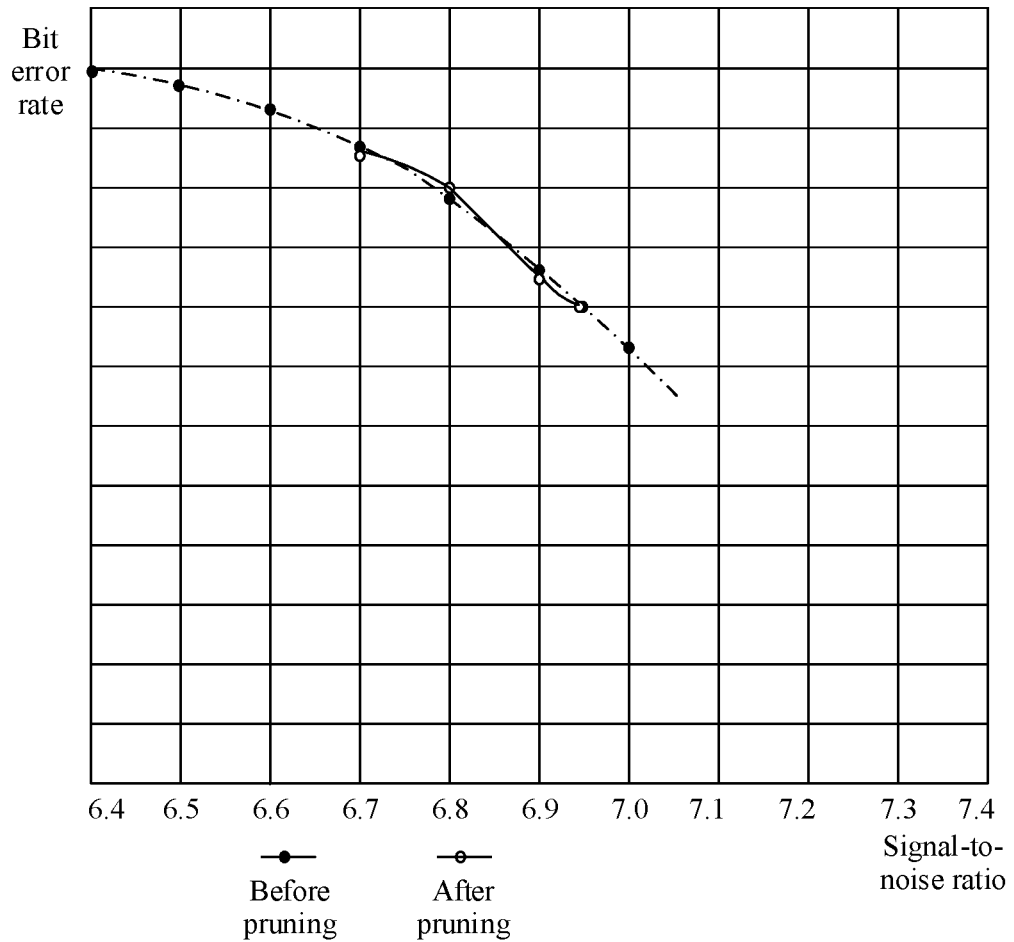
FIG. 7 is a schematic diagram of comparison of bit error rate performance according to an example embodiment of this application.

In this way, when the LDPC coding scheme for downlink encoding is used as the LDPC coding scheme for uplink encoding, an LDPC codeword data bit is 1824 bytes, an LDPC codeword parity bit is 336 bytes, and a code rate is 1824/(1824+336)=84.4. After the LDPC codeword data bit and the LDPC codeword parity bit are pruned, an LDPC codeword data bit in the LDPC coding scheme for uplink encoding is 1760 bytes, an LDPC codeword parity bit in the LDPC coding scheme for uplink encoding is 320 bytes, and a code rate is 1760/(1760+320)=84.6. The code rate is close to the code rate of the used LDPC coding scheme for downlink encoding. In addition, bit error rate performance is simulated, and a performance simulation result is shown in FIG. 7. Bit error rate performance after the pruning is close to bit error rate performance when the LDPC coding scheme for downlink encoding is used. In FIG. 7, a vertical coordinate represents a bit error rate, and a horizontal coordinate represents a signal-to-noise ratio.

It should be noted herein that the uplink rate being 12.5 Gbit/s actually indicates that the uplink rate is close to 12.5 Gbit/s (for example, an actual uplink rate can reach 12.4416 Gbit/s). Similarly, the uplink rates being 25 Gbit/s and 50 Gbit/s also indicate that the uplink rates are respectively close to 25 Gbit/s and 50 Gbit/s. An actual uplink rate of a 25G PON can reach 24.8832 Gbit/s. The uplink rate of the 50G PON can actually reach 49.7664 Gbit/s.

In a possible implementation, if N times an LDPC codeword data bit is divisible by a grant granularity, and M times an LDPC codeword parity bit is divisible by the grant granularity, an LDPC coding scheme for downlink encoding corresponding to an HSP may be directly used as an LDPC coding scheme for uplink encoding. In this case, in the LDPC coding scheme for uplink encoding, an LDPC codeword data bit is 1824 bytes, and an LDPC codeword parity bit is 336 bytes.

Figure 8:
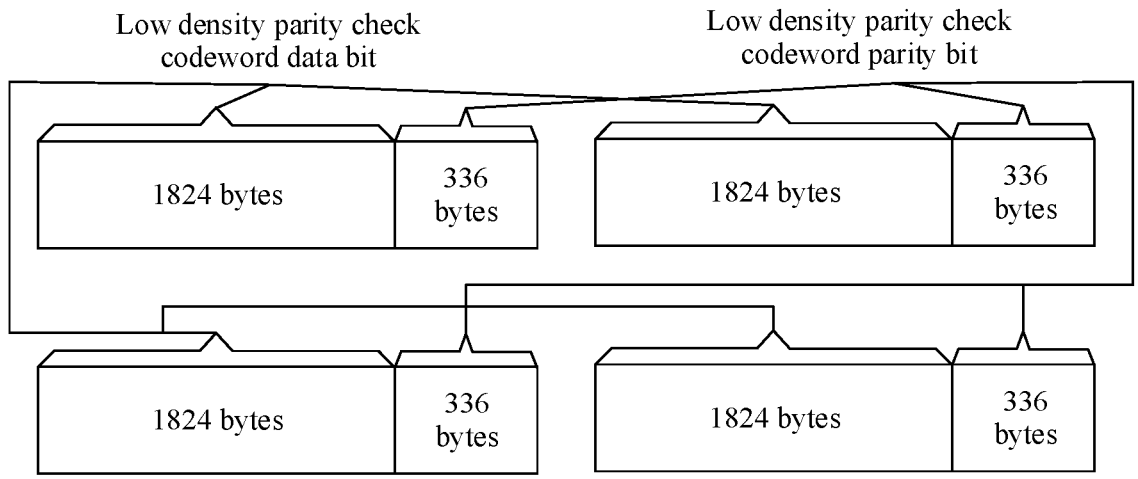
FIG. 8 is a schematic diagram of an FEC codeword according to an example embodiment of this application.

For the LDPC codeword data bit being 1824 bytes and the LDPC codeword parity bit being 336 bytes in the LDPC coding scheme for uplink encoding, there may be a plurality of options for the grant granularity. The following provides two possible manners:

1. The HSP is a 50G PON. The LDPC codeword data bit in the LDPC coding scheme for uplink encoding is 1824 bytes, and N is 2; and the LDPC codeword parity bit in the LDPC coding scheme is 336 bytes, and M is 4. In this way, when an uplink rate of the 50G PON is 12.5 Gbit/s, a corresponding grant granularity is 16 bytes, and 2 times the LDPC codeword data bit and 4 times the LDPC codeword parity bit in the LDPC coding scheme for uplink encoding are divisible by 16 bytes. When the uplink rate of the 50G PON is 25 Gbit/s, a corresponding grant granularity is 32 bytes, and 2 times the LDPC codeword data bit and 4 times the LDPC codeword parity bit in the LDPC coding scheme for uplink encoding are divisible by 32 bytes. When the uplink rate of the 50G PON is 50 Gbit/s, a corresponding grant granularity is 64 bytes, and 2 times the LDPC codeword data bit and 4 times the LDPC codeword parity bit in the LDPC coding scheme for uplink encoding are divisible by 64 bytes. For example, as shown in FIG. 8, a grant length is 64 bytes*114=7296 bytes, which is exactly equal to 1824 bytes*4. In this case, there are four FEC codewords, and LDPC codeword data bits of the four FEC codewords are all 1824 bytes. LDPC codeword parity bits are 4*336 bytes, and exactly 21 slots are reserved for transmitting the LDPC codeword parity bits.

2. The HSP is a 50G PON. The LDPC codeword data bit in the LDPC coding scheme for uplink encoding is 1824 bytes, and N is 1; and the LDPC codeword parity bit in the LDPC coding scheme is 336 bytes, and M is 1. In this way, when an uplink rate of the 50G PON is 12.5 Gbit/s, a corresponding grant granularity is 4 bytes, and the LDPC codeword data bit and the LDPC codeword parity bit in the LDPC coding scheme for uplink encoding are divisible by 4 bytes. When the uplink rate of the 50G PON is 25 Gbit/s, a corresponding grant granularity is 8 bytes, and the LDPC codeword data bit and the LDPC codeword parity bit in the LDPC coding scheme for uplink encoding are divisible by 8 bytes. When the uplink rate of the 50G PON is 50 Gbit/s, a corresponding grant granularity is 16 bytes, and the LDPC codeword data bit and the LDPC codeword parity bit in the LDPC coding scheme for uplink encoding are divisible by 16 bytes.

In this way, based on the existing LDPC coding scheme for downlink encoding, with a minimal modification (only the grant granularity is modified), a reuse logic design of downlink encoding and uplink encoding may be implemented to a maximum extent.

It should be noted herein that, when the LDPC coding scheme for downlink encoding is used as the LDPC coding scheme for uplink encoding, there are a plurality of possible implementations for selecting the grant granularity. The foregoing provides only two possible implementations as an example. In addition, when the grant granularity is modified, the LDPC codeword data bit is 1824 bytes, the LDPC codeword parity bit is 336 bytes, and a truncated LDPC codeword data bit is 0 bits, so that truncation is not needed. However, for the LDPC codeword parity bit, the existing LDPC coding scheme for downlink encoding is used, and the LDPC codeword parity bit needs to be pruned. Therefore, pruning also needs to be performed.

In a possible implementation, in an LDPC coding scheme, an LDPC codeword data bit is divisible by a grant granularity, and N times the LDPC codeword data bit is divisible by the grant granularity, where N is a positive integer greater than or equal to 1. In this case, an LDPC codeword data bit and an LDPC codeword parity bit in an FEC codeword need to be pruned, and the grant granularity is adjusted, so that bit error rate performance remains close to bit error rate performance of downlink encoding.

Corresponding to the FEC encoding procedure described above, in this application, an FEC decoding method is further provided, and the method may be performed by a decoding apparatus. The decoding apparatus may be a software program installed on an optical network device. The decoding apparatus may alternatively be a hardware apparatus, for example, an optical network device. The optical network device may be an OLT.

Figure 9:
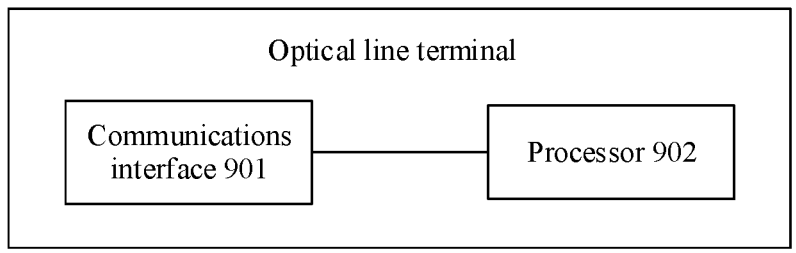
FIG. 9 is a schematic diagram of a structure of an OLT according to an example embodiment of this application.

When the decoding apparatus is a hardware apparatus, as shown in FIG. 9, a schematic diagram of a structure of an OLT is provided. The OLT includes a communications interface 901 and a processor 902.

The processor 902 may use a general-purpose CPU, a microprocessor, an ASIC, a GPU, or one or more integrated circuits. The processor 902 may alternatively be a DSP, an FPGA or another programmable logic device, a discrete gate or a transistor logic device, or a discrete hardware component. In this embodiment of this application, the processor 902 may be configured to implement FEC decoding processing.

The communications interface 901 is configured to implement communication between the OLT and another device. In this embodiment of this application, the communications interface 901 may be configured to receive an FEC codeword of uplink data.

Figure 10:
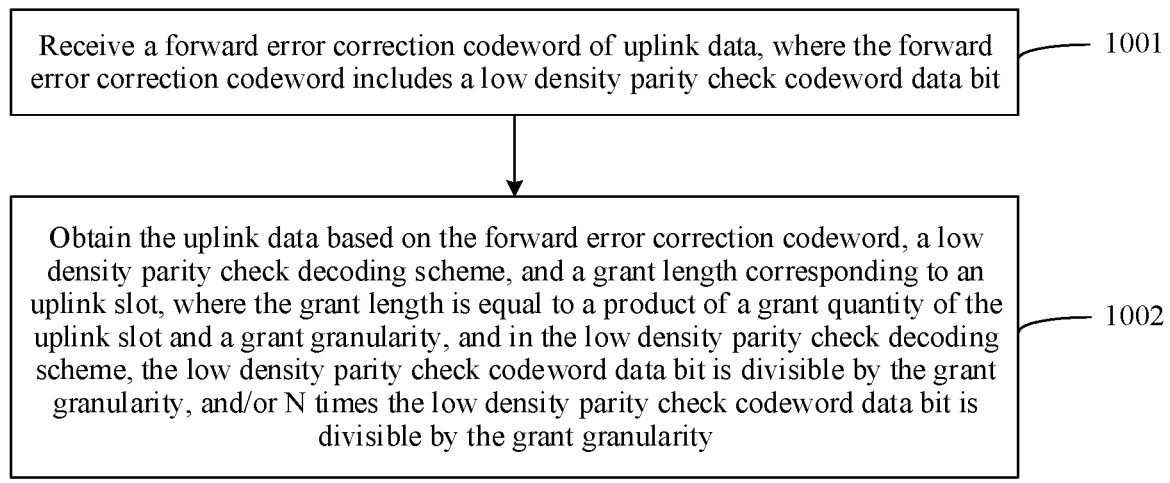
FIG. 10 is a schematic flowchart of a method for uplink FEC decoding according to an example embodiment of this application.

With reference to FIG. 10, the following describes a method for uplink FEC decoding provided in an embodiment of this application. The method may be performed by an OLT. FIG. 10 describes a procedure in which the OLT decodes uplink data sent by an ONU. As shown in FIG. 10, a processing procedure of the method is as follows:

Step 1001: Receive an FEC codeword of uplink data, where the FEC codeword includes an LDPC codeword data bit.

In this embodiment, the OLT receives, by using an optical fiber, the FEC codeword of the uplink data sent by the ONU in a granted slot. Each FEC codeword includes an LDPC codeword data bit and an LDPC codeword parity bit. Lengths of LDPC codeword parity bits included in all FEC codewords are the same, and LDPC codeword data bits included in all FEC codewords may be different based on a grant length, and depend on data volumes of uplink data in the FEC codewords.

Step 1002: Obtain the uplink data based on the FEC codeword, an LDPC decoding scheme, and a grant length corresponding to an uplink slot, where the grant length is equal to a product of a grant quantity of the uplink slot and a grant granularity. In the LDPC decoding scheme, the LDPC codeword data bit is divisible by the grant granularity, and/or N times the LDPC codeword data bit is divisible by the grant granularity, where N is a positive integer greater than or equal to 1.

In this embodiment, the LDPC decoding scheme corresponds to the LDPC coding scheme in step 402. The OLT may obtain a grant quantity of a slot allocated by the OLT to the ONU and a grant granularity of the ONU, and multiply the grant quantity and the grant granularity to obtain a grant length. The OLT may determine, based on the grant length allocated by the OLT to the ONU, the FEC codeword sent by the ONU, and then decode, by using the LDPC decoding scheme, the FEC codeword sent by the ONU, to obtain the uplink data sent by the ONU.

Optionally, an FEC decoding procedure may be implemented at a TC layer of the OLT. After the FEC codeword of the uplink data is received by using a physical layer of the OLT, the TC layer of the OLT may perform decoding processing to obtain the uplink data. Then, after subsequent processing at the TC layer of the OLT, if the uplink data is to be sent to a core network, the uplink data may be sent to the core network; or if the uplink data is to be sent to the OLT, the OLT may perform corresponding processing on the uplink data.

The following further describes the procedure shown in FIG. 10.

In a possible implementation, a relationship between the LDPC codeword parity bit in the LDPC decoding scheme and the grant granularity may be:

The FEC codeword further includes the LDPC codeword parity bit. In the LDPC decoding scheme, the LDPC codeword parity bit is divisible by the grant granularity, and/or M times the LDPC codeword parity bit is divisible by the grant granularity, where M is a positive integer greater than or equal to 1. For a detailed description, refer to the description of the LDPC coding scheme.

In a possible implementation, processing of step 1002 may be:

obtaining the uplink data based on the FEC codeword, the LDPC codeword data bit in the LDPC decoding scheme, a mother code matrix corresponding to the LDPC decoding scheme, and the grant length corresponding to the uplink slot.

The mother code matrix corresponding to the LDPC coding scheme may be pre-stored in the ONU. The mother code matrix may be a 12×69 quasi-cyclic matrix with a cycle size of 256. The mother code matrix herein is the same as a mother code matrix defined in downlink decoding.

In this embodiment, the OLT may determine, based on the grant length allocated by the OLT to the ONU, the FEC codeword sent by the ONU. Then, the OLT obtains a mother code matrix corresponding to an LDPC decoding scheme for downlink decoding, and determines the mother code matrix as a mother code matrix corresponding to an LDPC decoding scheme for uplink decoding. Each FEC codeword is checked to obtain the uplink data. For a detailed check process, refer to a standard of the LDPC decoding scheme for downlink decoding.

After an LDPC coding scheme for uplink encoding is determined, an LDPC codeword data bit in the LDPC decoding scheme for downlink decoding corresponds to an LDPC codeword data bit in the LDPC coding scheme for uplink encoding, and an LDPC codeword parity bit in the LDPC decoding scheme for downlink decoding corresponds to an LDPC codeword parity bit in the LDPC coding scheme for uplink encoding. The following provides a description.

In a possible implementation, when an HSP is a 50G PON, in an original LDPC decoding scheme for downlink decoding, an LDPC codeword data bit is 1824 bytes, and an LDPC codeword parity bit is 336 bytes. After the LDPC codeword data bit and the LDPC codeword parity bit are pruned, an LDPC codeword data bit in an LDPC decoding scheme for uplink decoding is 1760 bytes, and an LDPC codeword parity bit in the LDPC decoding scheme for uplink decoding is 320 bytes. When an uplink rate of the 50G PON is 12.5 Gbit/s, a corresponding grant granularity is 20 bytes, and the LDPC codeword data bit and the LDPC codeword parity bit in the LDPC decoding scheme for uplink decoding are divisible by 20 bytes. When the uplink rate of the 50G PON is 25 Gbit/s, a corresponding grant granularity is 40 bytes, and the LDPC codeword data bit and the LDPC codeword parity bit in the LDPC decoding scheme for uplink decoding are divisible by 40 bytes. When the uplink rate of the 50G PON is 50 Gbit/s, a corresponding grant granularity is 80 bytes, and the LDPC codeword data bit and the LDPC codeword parity bit in the LDPC decoding scheme for uplink decoding are divisible by 80 bytes.

In this way, when the LDPC decoding scheme for downlink decoding is used as the LDPC decoding scheme for uplink decoding, an LDPC codeword data bit is 1824 bytes, an LDPC codeword parity bit is 336 bytes, and a code rate is 1824/(1824+336)=84.4. After the LDPC codeword data bit and the LDPC codeword parity bit are pruned, an LDPC codeword data bit in the LDPC decoding scheme for uplink decoding is 1760 bytes, an LDPC codeword parity bit in the LDPC decoding scheme for uplink decoding is 320 bytes, and a code rate is 1760/(1760+320)=84.6. The code rate is close to the code rate of the used LDPC decoding scheme for downlink decoding.

In a possible implementation, if N times an LDPC codeword data bit is divisible by a grant granularity, and M times an LDPC codeword parity bit is divisible by the grant granularity, an LDPC decoding scheme for downlink decoding corresponding to an HSP may be directly used as an LDPC decoding scheme for uplink decoding. In this case, in the LDPC decoding scheme for uplink decoding, an LDPC codeword data bit is 1824 bytes, and an LDPC codeword parity bit is 336 bytes.

For the LDPC codeword data bit being 1824 bytes and the LDPC codeword parity bit being 336 bytes in the LDPC decoding scheme for uplink decoding, there may be a plurality of options for the grant granularity. The following provides two possible manners:

1. The HSP is a 50G PON. The LDPC codeword data bit in the LDPC decoding scheme for uplink decoding is 1824 bytes, and N is 2; and the LDPC codeword parity bit in the LDPC decoding scheme is 336 bytes, and M is 4. In this way, when an uplink rate of the 50G PON is 12.5 Gbit/s, a corresponding grant granularity is 16 bytes, and 2 times the LDPC codeword data bit and 4 times the LDPC codeword parity bit in the LDPC decoding scheme for uplink decoding are divisible by 16 bytes. When the uplink rate of the 50G PON is 25 Gbit/s, a corresponding grant granularity is 32 bytes, and 2 times the LDPC codeword data bit and 4 times the LDPC codeword parity bit in the LDPC decoding scheme for uplink decoding are divisible by 32 bytes. When the uplink rate of the 50G PON is 50 Gbit/s, a corresponding grant granularity is 64 bytes, and 2 times the LDPC codeword data bit and 4 times the LDPC codeword parity bit in the LDPC decoding scheme for uplink decoding are divisible by 64 bytes.

2. The HSP is a 50G PON. The LDPC codeword data bit in the LDPC decoding scheme for uplink decoding is 1824 bytes, and N is 1; and the LDPC codeword parity bit in the LDPC decoding scheme is 336 bytes, and M is 1. In this way, when an uplink rate of the 50G PON is 12.5 Gbit/s, a corresponding grant granularity is 4 bytes, and the LDPC codeword data bit and the LDPC codeword parity bit in the LDPC decoding scheme for uplink decoding are divisible by 4 bytes. When the uplink rate of the 50G PON is 25 Gbit/s, a corresponding grant granularity is 8 bytes, and the LDPC codeword data bit and the LDPC codeword parity bit in the LDPC decoding scheme for uplink decoding are divisible by 8 bytes. When the uplink rate of the 50G PON is 50 Gbit/s, a corresponding grant granularity is 16 bytes, and the LDPC codeword data bit and the LDPC codeword parity bit in the LDPC decoding scheme for uplink decoding are divisible by 16 bytes.

In this way, based on the existing LDPC decoding scheme for downlink decoding, with a minimal modification, a reuse logic design of downlink decoding and uplink decoding may be implemented to a maximum extent.

In this embodiment of this application, decoding (decode) may also be referred to as deciphering.

Figure 11:
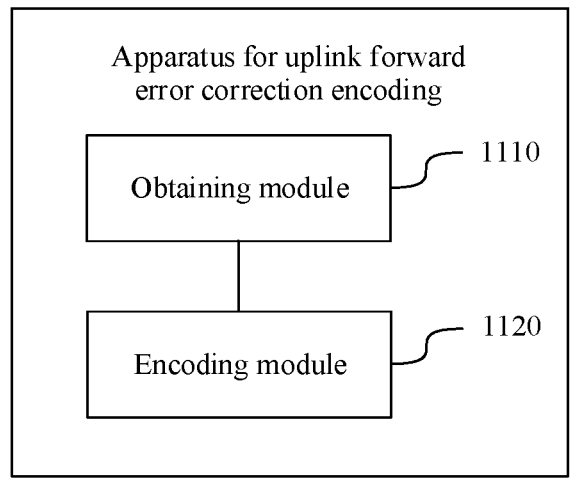
FIG. 11 is a schematic diagram of a structure of an apparatus for uplink FEC encoding according to an example embodiment of this application.

FIG. 11 is a diagram of a structure of an apparatus for uplink FEC encoding according to an embodiment of this application. The apparatus is used in an HSP, and an uplink rate of the HSP is greater than 10 Gbit/s. The apparatus may be implemented as a part or all of the apparatus by using software, hardware, or a combination of software and hardware. The apparatus provided in this embodiment of this application may implement the procedure described in FIG. 4 in the embodiments of this application. The apparatus includes an obtaining module 1110 and an encoding module 1120.

The obtaining module 1110 is configured to obtain a grant length of an uplink slot, where the grant length is equal to a product of a grant quantity of the uplink slot and a grant granularity, and the grant granularity is a grant granularity supported by a device to which the uplink slot belongs. The obtaining module 1110 may be specifically configured to implement an obtaining function of step 401 and perform an implicit step included in step 401.

The encoding module 1120 is configured to obtain an FEC codeword of uplink data based on the grant length and a low density parity check LDPC coding scheme, where the FEC codeword includes an LDPC codeword data bit. In the LDPC coding scheme, the LDPC codeword data bit is divisible by the grant granularity, and/or N times the LDPC codeword data bit is divisible by the grant granularity, where N is a positive integer greater than or equal to 1. The encoding module 1120 may be specifically configured to implement an encoding function of step 402 and perform an implicit step included in step 402.

In a possible implementation, the FEC codeword further includes an LDPC codeword parity bit. In the LDPC coding scheme, the LDPC codeword parity bit is divisible by the grant granularity, and/or M times the LDPC codeword parity bit is divisible by the grant granularity, where M is a positive integer greater than or equal to 1.

In a possible implementation, the encoding module 1120 is configured to:
obtain the FEC codeword of the uplink data based on the grant length, the LDPC codeword data bit in the LDPC coding scheme, and a mother code matrix corresponding to the LDPC coding scheme.

In a possible implementation, the HSP is a 50G passive optical network PON. The LDPC codeword data bit in the LDPC coding scheme is 1760 bytes, and the LDPC codeword parity bit in the LDPC coding scheme is 320 bytes.

When an uplink rate of the 50G PON is 12.5 Gbit/s, a corresponding grant granularity is 20 bytes.

When the uplink rate of the 50G PON is 25 Gbit/s, a corresponding grant granularity is 40 bytes.

When the uplink rate of the 50G PON is 50 Gbit/s, a corresponding grant granularity is 80 bytes.

In a possible implementation, N times the LDPC codeword data bit is divisible by the grant granularity, M times the LDPC codeword parity bit is divisible by the grant granularity, and the LDPC coding scheme is an LDPC coding scheme for downlink encoding corresponding to the HSP.

In a possible implementation, the HSP is a 50G PON. The LDPC codeword data bit in the LDPC coding scheme is 1824 bytes, and N is 2; and the LDPC codeword parity bit in the LDPC coding scheme is 336 bytes, and M is 4.

When an uplink rate of the 50G PON is 12.5 Gbit/s, a corresponding grant granularity is 16 bytes.

When the uplink rate of the 50G PON is 25 Gbit/s, a corresponding grant granularity is 32 bytes.

When the uplink rate of the 50G PON is 50 Gbit/s, a corresponding grant granularity is 64 bytes.

In a possible implementation, the HSP is a 50G PON. The LDPC codeword data bit in the LDPC coding scheme is 1824 bytes, and N is 1; and the LDPC codeword parity bit in the LDPC coding scheme is 336 bytes, and M is 1.

When an uplink rate of the 50G PON is 12.5 Gbit/s, a corresponding grant granularity is 4 bytes.

When the uplink rate of the 50G PON is 25 Gbit/s, a corresponding grant granularity is 8 bytes.

When the uplink rate of the 50G PON is 50 Gbit/s, a corresponding grant granularity is 16 bytes.

Figure 12:
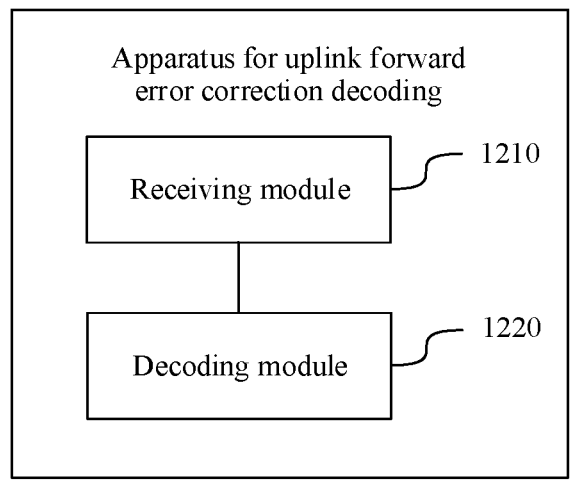
FIG. 12 is a schematic diagram of a structure of an apparatus for uplink FEC decoding according to an example embodiment of this application.

FIG. 12 is a diagram of a structure of an apparatus for uplink FEC decoding according to an embodiment of this application. The apparatus is used in an HSP, and an uplink rate of the HSP is greater than 10 Gbit/s. The apparatus may be implemented as a part or all of the apparatus by using software, hardware, or a combination of software and hardware. The apparatus provided in this embodiment of this application may implement the procedure described in FIG. 10 in the embodiments of this application. The apparatus includes a receiving module 1210 and a decoding module 1220.

The receiving module 1210 is configured to receive an FEC codeword of uplink data, where the FEC codeword includes a low density parity check LDPC codeword data bit. The receiving module 1210 may be specifically configured to implement a receiving function of step 1001 and perform an implicit step included in step 1001.

The decoding module 1220 is configured to obtain the uplink data based on the FEC codeword, an LDPC decoding scheme, and a grant length corresponding to an uplink slot, where the grant length is equal to a product of a grant quantity of the uplink slot and a grant granularity. In the LDPC decoding scheme, the LDPC codeword data bit is divisible by the grant granularity, and/or N times the LDPC codeword data bit is divisible by the grant granularity, where N is a positive integer greater than or equal to 1. The decoding module 1220 may be specifically configured to implement a decoding function of step 1002 and perform an implicit step included in step 1002.

In a possible implementation, the FEC codeword further includes an LDPC codeword parity bit. In the LDPC decoding scheme, the LDPC codeword parity bit is divisible by the grant granularity, and/or M times the LDPC codeword parity bit is divisible by the grant granularity, where M is a positive integer greater than or equal to 1.

In a possible implementation, the decoding module 1220 is configured to:
obtain the uplink data based on the FEC codeword, the LDPC codeword data bit in the LDPC decoding scheme, a mother code matrix corresponding to the LDPC decoding scheme, and the grant length corresponding to the uplink slot.

In a possible implementation, the HSP is a 50G passive optical network PON. The LDPC codeword data bit in the LDPC decoding scheme is 1760 bytes, and the LDPC codeword parity bit in the LDPC decoding scheme is 320 bytes.

When an uplink rate of the 50G PON is 12.5 Gbit/s, a corresponding grant granularity is 20 bytes.

When the uplink rate of the 50G PON is 25 Gbit/s, a corresponding grant granularity is 40 bytes.

When the uplink rate of the 50G PON is 50 Gbit/s, a corresponding grant granularity is 80 bytes.

In a possible implementation, N times the LDPC codeword data bit is divisible by the grant granularity, M times the LDPC codeword parity bit is divisible by the grant granularity, and the LDPC decoding scheme is an LDPC decoding scheme for downlink decoding corresponding to the HSP.

In a possible implementation, the HSP is a 50G PON. The LDPC codeword data bit in the LDPC decoding scheme is 1824 bytes, and N is 2; and the LDPC codeword parity bit in the LDPC decoding scheme is 336 bytes, and M is 4.

When an uplink rate of the 50G PON is 12.5 Gbit/s, a corresponding grant granularity is 16 bytes.

When the uplink rate of the 50G PON is 25 Gbit/s, a corresponding grant granularity is 32 bytes.

When the uplink rate of the 50G PON is 50 Gbit/s, a corresponding grant granularity is 64 bytes.

In a possible implementation, the HSP is a 50G PON. The LDPC codeword data bit in the LDPC decoding scheme is 1824 bytes, and N is 1; and the LDPC codeword parity bit in the LDPC decoding scheme is 336 bytes, and M is 1.

When an uplink rate of the 50G PON is 12.5 Gbit/s, a corresponding grant granularity is 4 bytes.

When the uplink rate of the 50G PON is 25 Gbit/s, a corresponding grant granularity is 8 bytes.

When the uplink rate of the 50G PON is 50 Gbit/s, a corresponding grant granularity is 16 bytes.

Division into the modules in embodiments of this application is an example, and is merely logical function division. During actual implementation, another division manner may be used. In addition, the functional modules in embodiments of this application may be integrated into one processor, or each of the modules may exist alone physically, or two or more modules may be integrated into one module. The integrated module may be implemented in a form of hardware, or may be implemented in a form of a software functional module.

When the integrated module is implemented in the form of the software functional module and sold or used as an independent product, the integrated module may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing an optical network device (which may be an ONU or the like) or a processor to perform all or some of the steps of the method in embodiments of this application. The foregoing storage medium includes any medium that can store program code, such as a USB flash drive, a removable hard disk, a ROM, a RAM, a magnetic disk, or an optical disc.

In the foregoing embodiments, all or a part of the technical solutions may be implemented by using software, hardware, firmware, or any combination thereof. When implemented by using software, all or a part of the technical solutions may be implemented in a form of a computer program product. The computer program product includes one or more computer instructions, and when the computer instructions are loaded and executed on an optical network device, the procedures or functions described in the embodiments of this application are all or partially generated. The computer instructions may be stored in a computer-readable storage medium, or transmitted from one computer-readable storage medium to another computer-readable storage medium. For example, the computer instructions may be transmitted from an ONU to an OLT by using an optical fiber. The computer-readable storage medium may be any usable medium accessible by an optical network terminal, or a data storage device, for example, a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid-state drive).

What is claimed is:

1. A method for uplink forward error correction (FEC) encoding, wherein the method is applied to a high speed passive optical network (HSP), an uplink rate of the HSP is greater than 10 Gbit/s, and the method comprises:
    obtaining an FEC codeword of uplink data based on a grant length for transmitting upstream data by an optical network unit (ONU) to an optical line terminal (OLT) and a low density parity check (LDPC) coding scheme, wherein the grant length is equal to a multiplication product of a grant quantity and a grant granularity, and the grant granularity is supported by the ONU; the FEC codeword comprises an LDPC codeword data bit, and in the LDPC coding scheme, N times the LDPC codeword data bit is divisible by the grant granularity, wherein N is a positive integer greater than or equal to 1.

2. The method according to claim 1, wherein the FEC codeword further comprises an LDPC codeword parity bit, and in the LDPC coding scheme, M times the LDPC codeword parity bit is divisible by the grant granularity, wherein M is a positive integer greater than or equal to 1.

3. The method according to claim 2, wherein N is greater than 1, and M is greater than 1, and the LDPC coding scheme is an LDPC coding scheme for downlink encoding corresponding to the HSP.

4. The method according to claim 2, wherein the HSP is a 50G PON, the LDPC codeword parity bit in the LDPC coding scheme is 336 bytes, and M is 4.

5. A method for uplink forward error correction (FEC) decoding, wherein the method is applied to a high speed passive optical network (HSP), an uplink rate of the HSP is greater than 10 Gbit/s, and the method comprises:
    receiving an FEC codeword of uplink data, wherein the FEC codeword comprises a low density parity check (LDPC) codeword data bit; and
    obtaining the uplink data based on the FEC codeword and an LDPC decoding scheme, wherein the FEC codeword of uplink data is obtained based on a grant length for transmitting upstream data by an optical network unit (ONU) to an optical line terminal (OLT) and LDPC coding scheme, wherein the grant length is equal to a multiplication product of a grant quantity and a grant granularity, and in the LDPC decoding scheme, N times the LDPC codeword data bit is divisible by the grant granularity, wherein N is a positive integer greater than or equal to 1.

6. The method according to claim 5, wherein the FEC codeword further comprises an LDPC codeword parity bit, and in the LDPC decoding scheme, M times the LDPC codeword parity bit is divisible by the grant granularity, wherein M is a positive integer greater than or equal to 1.

7. The method according to claim 6, wherein N is greater than 1, and M is greater than 1, and the LDPC decoding scheme is an LDPC decoding scheme for downlink decoding corresponding to the HSP.

8. The method according to claim 6, wherein the HSP is a 50G PON, the LDPC codeword parity bit in the LDPC decoding scheme is 336 bytes, and M is 4.

9. An apparatus for uplink forward error correction (FEC) encoding, wherein the apparatus comprises:
    a processor, configured to obtain an FEC codeword of uplink data based on a grant length for transmitting upstream data by an optical network unit (ONU) to an optical line terminal (OLT) and a low density parity check (LDPC) coding scheme, wherein the grant length is equal to a multiplication product of a grant quantity and a grant granularity, and the grant granularity is supported by the ONU; the FEC codeword comprises an LDPC codeword data bit, and in the LDPC coding scheme, N times the LDPC codeword data bit is divisible by the grant granularity, wherein N is a positive integer greater than or equal to 1.

10. The apparatus according to claim 9, wherein the FEC codeword further comprises an LDPC codeword parity bit, and in the LDPC coding scheme, M times the LDPC codeword parity bit is divisible by the grant granularity, wherein M is a positive integer greater than or equal to 1.

11. The apparatus according to claim 10, wherein N is greater than 1, and M is greater than 1, and the LDPC coding scheme is an LDPC coding scheme for downlink encoding.

12. The apparatus according to claim 10, wherein the apparatus is applied to 50GPON, the LDPC codeword parity bit in the LDPC coding scheme is 336 bytes, and M is 4.

13. The method according to claim 1, wherein the HSP is a 50G PON, the LDPC codeword data bit in the LDPC coding scheme is 1824 bytes, N is 2.

14. The method according to claim 4, wherein the LDPC codeword data bit in the LDPC coding scheme is 1824 bytes, N is 2.

15. The method according to claim 1, wherein the HSP is a 50G PON,
    when an uplink rate of the 50G PON is 12.5 Gbit/s, a corresponding grant granularity is 16 bytes; or
    when the uplink rate of the 50G PON is 25 Gbit/s, a corresponding grant granularity is 32 bytes; or
    when the uplink rate of the 50G PON is 50 Gbit/s, a corresponding grant granularity is 64 bytes.

16. The method according to claim 4, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

17. The method according to claim 13, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

18. The method according to claim 14, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

19. The method according to claim 5, wherein the HSP is a 50G PON, the LDPC codeword data bit in the LDPC decoding scheme is 1824 bytes, N is 2.

20. The method according to claim 8, wherein the LDPC codeword data bit in the LDPC decoding scheme is 1824 bytes, N is 2.

21. The method according to claim 5, wherein the HSP is a 50G PON,
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

22. The method according to claim 8, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

23. The method according to claim 19, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

24. The method according to claim 20, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

25. The apparatus according to claim 9, wherein the apparatus is applied to 50GPON, the LDPC codeword data bit in the LDPC coding scheme is 1824 bytes, N is 2.

26. The apparatus according to claim 12, wherein the LDPC codeword data bit in the LDPC coding scheme is 1824 bytes, N is 2.

27. The apparatus according to claim 9, wherein the apparatus is applied to 50GPON,
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

28. The apparatus according to claim 12, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

29. The apparatus according to claim 25, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

30. The apparatus according to claim 26, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

31. An apparatus for uplink forward error correction (FEC) decoding, wherein the apparatus comprises:
a communications interface, configured to receive an FEC codeword of uplink data, wherein the FEC codeword comprises a low density parity check (LDPC) codeword data bit;
a processor, configured to obtain the uplink data based on the FEC codeword and an LDPC decoding scheme, wherein the FEC codeword of uplink data is obtained based on a grant length for transmitting upstream data by an optical network unit (ONU) to an optical line terminal (OLT) and an LDPC coding scheme, wherein the grant length is equal to a multiplication product of a grant quantity and a grant granularity, and in the LDPC decoding scheme, N times the LDPC codeword data bit is divisible by the grant granularity, wherein N is a positive integer greater than or equal to 1.

32. The apparatus according to claim 31, wherein the FEC codeword further comprises an LDPC codeword parity bit, and in the LDPC coding scheme, M times the LDPC codeword parity bit is divisible by the grant granularity, wherein M is a positive integer greater than or equal to 1.

33. The apparatus according to claim 32, wherein N is greater than 1, and M is greater than 1, and the LDPC coding scheme is an LDPC coding scheme for downlink encoding.

34. The apparatus according to claim 32, wherein the apparatus is applied to 50GPON, the LDPC codeword parity bit in the LDPC coding scheme is 336 bytes, and M is 4.

35. The apparatus according to claim 31, wherein the apparatus is applied to 50GPON, the LDPC codeword data bit in the LDPC coding scheme is 1824 bytes, N is 2.

36. The apparatus according to claim 34, wherein the LDPC codeword data bit in the LDPC coding scheme is 1824 bytes, N is 2.

37. The apparatus according to claim 31, wherein the apparatus is applied to 50GPON,
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

38. The apparatus according to claim 34, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

39. The apparatus according to claim 35, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

40. The apparatus according to claim 36, wherein
when an uplink rate of the 50G PON is 12.5 Gbit/s, a corresponding grant granularity is 16 bytes; or
when the uplink rate of the 50G PON is 25 Gbit/s, a corresponding grant granularity is 32 bytes; or
when the uplink rate of the 50G PON is 50 Gbit/s, a corresponding grant granularity is 64 bytes.

* * * * *